(12) United States Patent
Sakurai et al.

(10) Patent No.: US 10,390,282 B2
(45) Date of Patent: Aug. 20, 2019

(54) WIRELESS COMMUNICATION SYSTEM, WIRELESS RELAY APPARATUS, AND DATA RECEIVING METHOD FOR WIRELESS TERMINAL

(71) Applicant: FUJITSU LIMITED, Kawasaki-shi, Kanagawa (JP)

(72) Inventors: Katsumi Sakurai, Kamo (JP); Yuji Takahashi, Minato (JP); Takashi Higashinakagawa, Yokohama (JP); Yasuyuki Kawaida, Yokohama (JP); Tadashige Iwao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 14/963,663

(22) Filed: Dec. 9, 2015

(65) Prior Publication Data

US 2016/0219491 A1 Jul. 28, 2016

(30) Foreign Application Priority Data

Jan. 28, 2015 (JP) ................................. 2015-014714

(51) Int. Cl.
*H04W 40/22* (2009.01)
*H04B 7/155* (2006.01)
(Continued)

(52) U.S. Cl.
CPC ............ *H04W 40/22* (2013.01); *H04B 7/155* (2013.01); *H04Q 9/00* (2013.01);
(Continued)

(58) Field of Classification Search
None
See application file for complete search history.

(56) References Cited

U.S. PATENT DOCUMENTS

| 7,974,227 B1 * | 7/2011 | Seay .................... H04B 7/155 370/315 |
| 2005/0018679 A1 | 1/2005 | Iwami |

(Continued)

FOREIGN PATENT DOCUMENTS

| CN | 104040902 A | 9/2014 |
| FR | 2826485 A1 | 12/2002 |

(Continued)

OTHER PUBLICATIONS

Extended European Search Report dated Jun. 29, 2016 for corresponding European Patent Application No. 15199241.9, 8 pages.

(Continued)

*Primary Examiner* — Jeffrey M Rutkowski
*Assistant Examiner* — Mehedi S Aley
(74) *Attorney, Agent, or Firm* — Fujitsu Patent Center

(57) ABSTRACT

In a wireless communication system that includes a plurality of wireless terminals each of which has a first device type and transmits data to a destination, and a plurality of wireless relay apparatuses each of which has a second device type and relays the data that is received in wireless communication with each wireless terminal to the destination, each of the plurality of wireless terminals detects a wireless frame, receives data contained in the wireless frame when the detected wireless frame contains information that represents the first device type, and avoids receiving data contained in the wireless frame when the detected wireless frame contains information that represents the second device type.

13 Claims, 11 Drawing Sheets

(51) Int. Cl.
   *H04Q 9/00* (2006.01)
   *H04W 52/02* (2009.01)
   *H04W 84/18* (2009.01)

(52) U.S. Cl.
   CPC ... *H04W 52/0219* (2013.01); *H04W 52/0245* (2013.01); *H04Q 2209/40* (2013.01); *H04Q 2209/883* (2013.01); *H04W 84/18* (2013.01); *Y02D 70/00* (2018.01); *Y02D 70/446* (2018.01)

(56) References Cited

U.S. PATENT DOCUMENTS

| | | | |
|---|---|---|---|
| 2005/0275528 A1* | 12/2005 | Kates | G08B 1/08 340/539.22 |
| 2006/0252443 A1 | 11/2006 | Sammour et al. | |
| 2009/0296619 A1 | 12/2009 | Sammour et al. | |
| 2011/0149822 A1 | 6/2011 | Sammour et al. | |
| 2013/0294328 A1 | 11/2013 | Aboul-Magd et al. | |
| 2014/0004865 A1* | 1/2014 | Bhargava | H04W 74/0816 455/445 |
| 2014/0133380 A1 | 5/2014 | Sammour et al. | |
| 2015/0223163 A1 | 8/2015 | Sammour et al. | |
| 2015/0358069 A1 | 12/2015 | Aboul-Magd et al. | |
| 2016/0295453 A1* | 10/2016 | Minamiyama | H04W 40/02 |
| 2017/0273021 A1 | 9/2017 | Sammour et al. | |

FOREIGN PATENT DOCUMENTS

| | | |
|---|---|---|
| JP | 11-243590 A | 9/1999 |
| JP | 2008-109198 A | 5/2008 |
| JP | 2008-539665 A | 11/2008 |
| JP | 2009-177292 | 8/2009 |
| JP | 2013-110719 A | 6/2013 |

OTHER PUBLICATIONS

Japanese Office Action dated Jan. 8, 2019 for corresponding Japanese Patent Application No. 2015-014714, wit English Translation, 7 pages.

Japanese Office Action dated Sep. 25, 2018 for corresponding Japanese Patent Application No. 2015-014714, with English Translation, 7 pages.

Chinese Office Action dated Jul. 30, 2018 for corresponding Chinese Patent Application No. 201511032400.1, with English Translation, 27 pages. Please note US-2005-0018679-A1 cited herewith, was cited in IDS filed on Sep. 14, 2016.*.

* cited by examiner

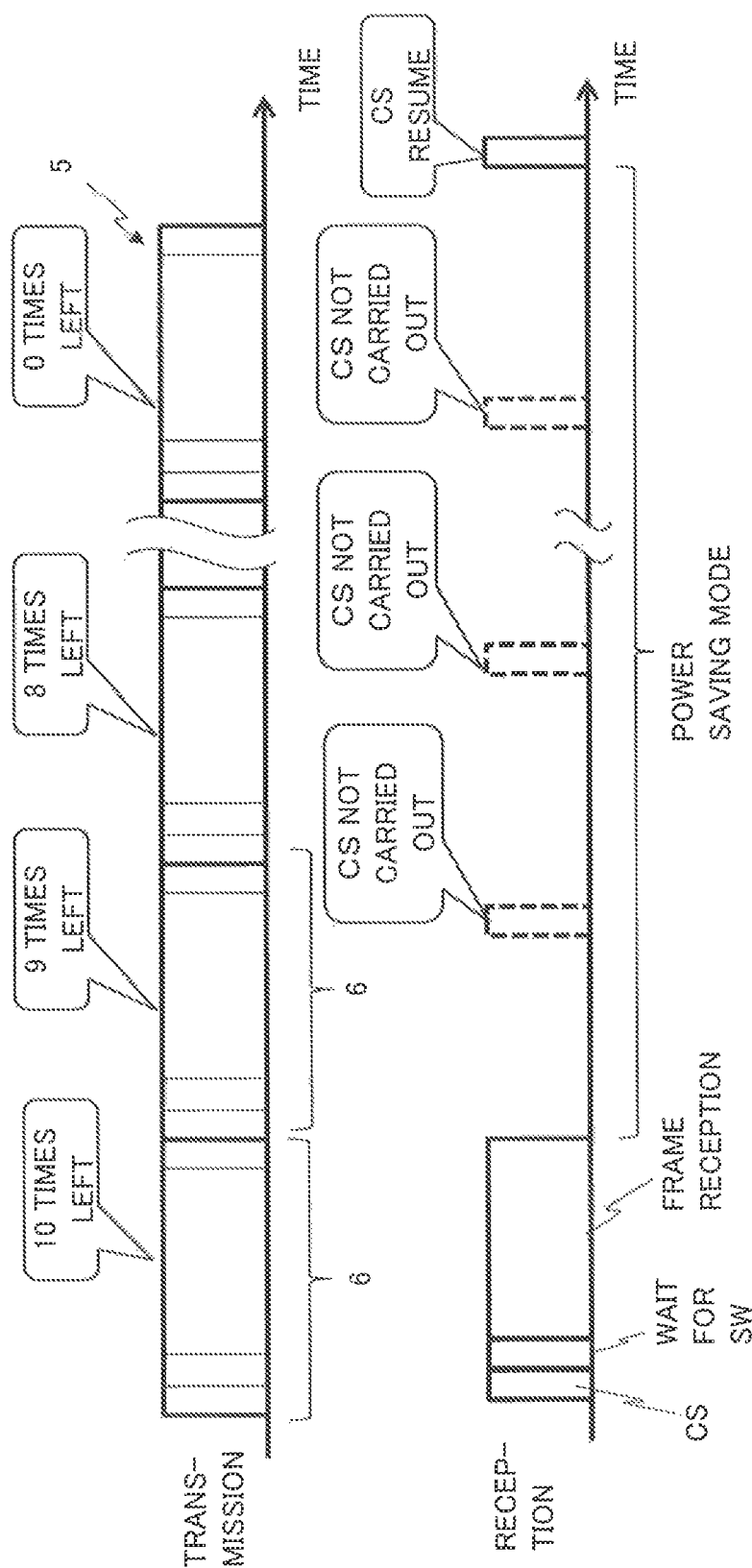

WIRELESS COMMUNICATION SYSTEM, WIRELESS RELAY APPARATUS, AND DATA RECEIVING METHOD FOR WIRELESS TERMINAL

CROSS-REFERENCE TO RELATED APPLICATION

This application is based upon and claims the benefit of priority of the prior Japanese Application No. 2015-014714 filed on Jan. 28, 2015, the entire contents of which are incorporated herein by reference.

FIELD

The present disclosure relates to a wireless communication system, a wireless relay, and a data receiving method for a wireless terminal.

BACKGROUND

There is a communication system in which each of a plurality of wireless terminals, sharing a carrier (a wireless channel), transmits data obtained by a sensor to a destination host. When strict demands for power saving are imposed on each wireless terminal, a relay network is provided between the plurality of wireless terminals and the destination host. The relay network is a wireless network formed by a plurality of wireless relay apparatuses. The provision of the relay network allows the coverage of radio waves from each wireless terminal to be narrowed as compared with the case without the relay network. The data transmitted from each wireless terminal reaches the destination host via one, or two or more wireless relay apparatuses.

For further information, see Japanese Laid-Open Patent Publication No. 2009-177292.

The demands for power saving, namely, demands for the reduction of power consumption may be imposed also on wireless relays. One of the factors causing power consumption in each wireless terminals and wireless relay apparatuses is a receiving process of wireless frames that each of the terminals and the relay apparatuses does not need to receive.

When a carrier is shared among a plurality of wireless terminals, each wireless relay apparatus performs carrier sense on the carrier and performs a process of receiving data in a detected wireless frame. For that reason, the wireless relay apparatuses also share the carrier with the wireless terminals. In this case, when a wireless terminal or a wireless relay apparatus exists within an area where a radio wave transmitted from each of the other wireless terminals and wireless relay apparatuses reaches, the wireless terminal or the wireless relay apparatus performs a receiving process with power consumption even when the wireless frame is not addressed to the wireless terminal or the wireless relay apparatus. In such a manner, there are some cases where needless receiving processes waste power.

SUMMARY

According to one aspect, a wireless communication system comprises:
a plurality of sensors each of which belongs to a first device type;
a relay apparatus belonging to a second device type, the relay apparatus being capable of wireless communication with the plurality of sensors; and
a communication apparatus belonging to a third device type, the communication apparatus being capable of wireless communication with the relay apparatus,
each of the plurality of sensors comprising a wireless processing unit,
the wireless processing unit being configured to perform a process of generating and transmitting a wireless signal containing data to which identification information corresponding to a device type of a device being a destination is added when wireless transmission is performed,
the wireless processing unit being configured to perform a process of passing data obtained by wireless processing to an upper processing unit when wireless reception is performed and identification information corresponding to the first device type is added, and
the wireless processing unit being configured to perform a process of not passing the data obtained by the wireless processing to the upper processing unit when the wireless reception is performed and information corresponding to the second or third device type is added, and
the relay apparatus comprising a wireless processing unit configured to provide data contained in a received wireless signal to the upper processing device when the received wireless signal contains identification information corresponding to the second device type.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 11 is an explanatory diagram of operational advantage according to the embodiment.

DESCRIPTION OF EMBODIMENTS

Hereinafter, an embodiment will be described with reference to accompanying drawings. The configurations of the embodiment are merely an example, and the present invention is not limited to the configurations of the embodiment.

[System Configuration]

Figure 1:
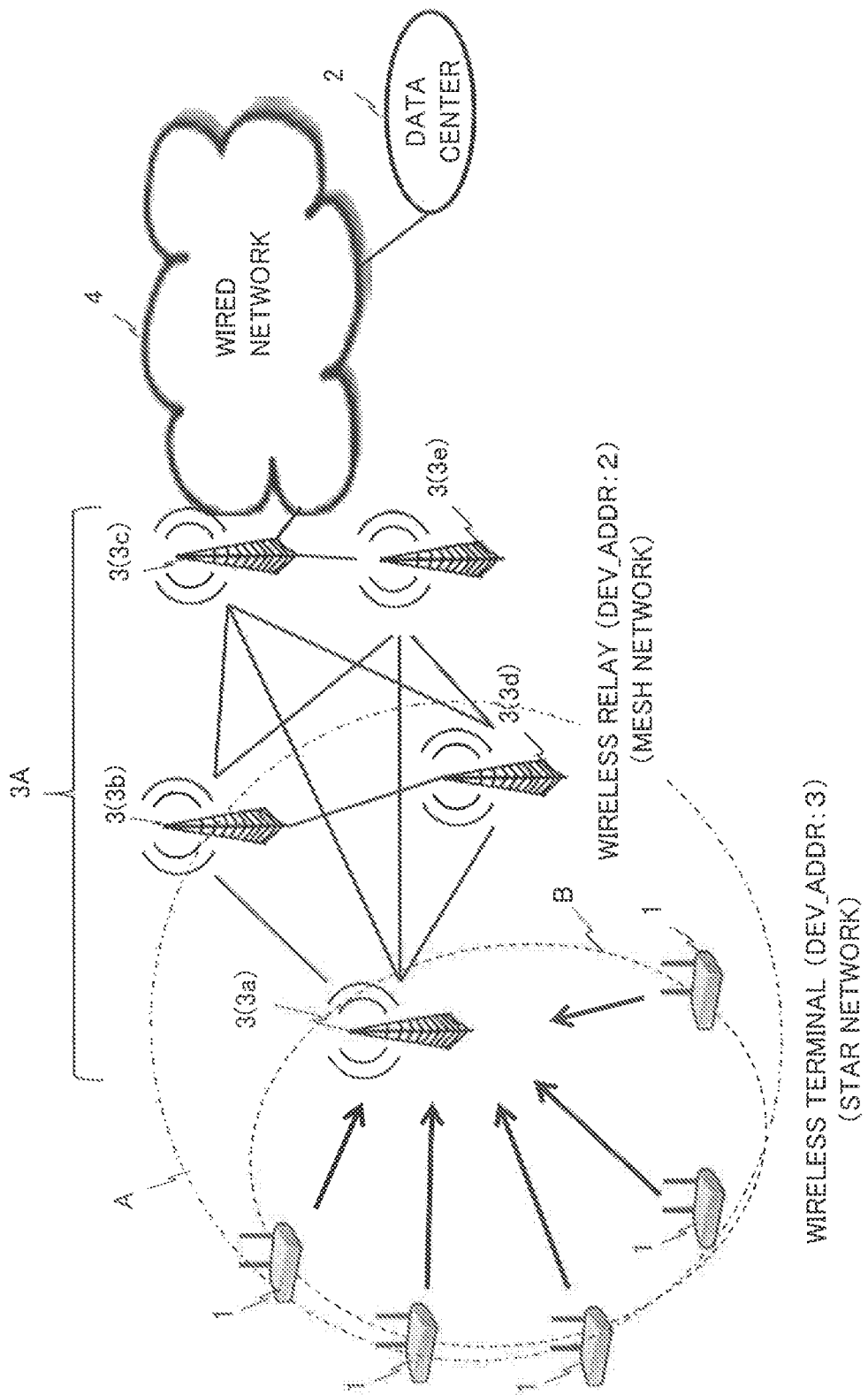
FIG. 1 is a configuration example of a communication system (network system) according to an embodiment.

FIG. 1 illustrates a configuration example of a communication system (network system) according to the embodiment. In FIG. 1, the communication system includes a plurality of wireless terminals 1 (hereafter, also denoted as sensor nodes 1) that transmit data (or data items) obtained by sensors, respectively, and a data center 2 where a computer (a destination host) collecting data from each of the sensor nodes 1 is disposed. The plurality of sensor nodes 1 are an example of "a plurality of sensors belonging to a first device type", relay nodes 3 are an example of "a relay apparatus and being communicatable with a plurality of sensor and belonging a second device type", and the destination host in the data center 2 is an example of "a communication apparatus belonging to a third device type".

The plurality of sensor nodes 1 are connected to the data center 2 over a relay network. The relay network includes a wireless network 3A that is formed by a plurality of wireless relay apparatuses (hereafter, denoted as relay nodes) 3 and a wired network 4 that connects the wireless network 3A and the data center 2. To the wired network 4, for example, a Local Area Network (LAN) or a public network such as the Internet can be applied. In the following description, a sensor node 1 or a relay node 3 may be denoted as a node when they are treated the same.

The wireless network 3A may be formed by two or more relay nodes 3. In the example illustrated in FIG. 1, the wireless network 3A includes, as an illustration of the plurality of relay nodes 3, relay nodes 3a to 3e that are connected in the form of a mesh (note that the relay nodes 3a to 3e will be denoted as relay nodes 3 when they are treated the same). However, the network topology of the relay nodes 3 is not limited to mesh one. For example, the plurality of relay nodes 3 may be connected in series. One of the plurality of relay nodes 3 (the relay node 3e in FIG. 1) includes a line interface (a line I/F), which is not illustrated, and is connected to the wired network 4 via the line I/F.

The sensor nodes 1 are connected to a specific relay node 3 so that a star network is formed. In the example illustrated in FIG. 1, the plurality of sensor nodes 1 is connected to the relay node 3a so that a star network is formed. Note that, with respect to each of the other relay nodes 3b to 3e, a plurality of sensor nodes 1 are connected in order to form a star network, although not illustrated in FIG. 1.

Data transmitted from sensor nodes 1 toward the data center 2 are received by the relay node 3a. Each relay node 3 collects the data items from the sensor nodes 1 and transmits the data items toward the data center 2. The data are finally transferred to the relay node 3e. The relay node 3e sends out the data to the wired network 4. The data are transmitted over the wired network 4 and received at the data center 2. The data may be transmitted via one or more relay nodes 3 before reaching the relay node 3e.

Figure 3:
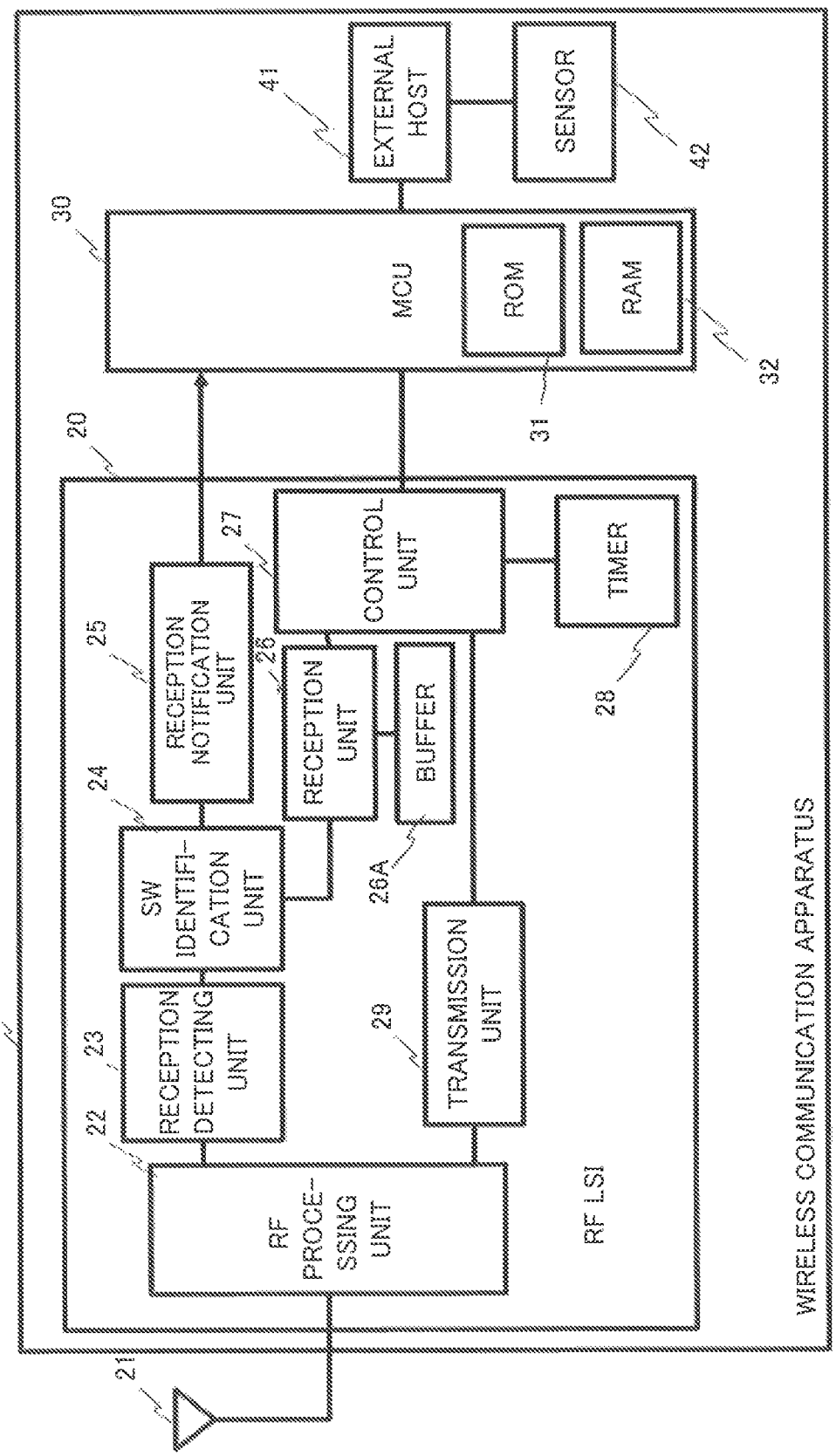
FIG. 3 illustrates a configuration example of a wireless communication apparatus 10 that is operable as either a sensor node or a relay node.

Each of the sensor nodes 1 and the relay nodes 3 performs intermittent reception. Each of the sensor nodes 1 and the relay nodes 3 includes a wireless device that transmits and receives wireless signals. The wireless device is, for example, an RF LSI 20 that is illustrated in FIG. 3. The wireless device releases power saving mode and tries sensing a carrier (a wireless signal), at predetermined intervals (monitoring intervals). In the sensing, when detecting a wireless signal, the wireless device performs the receiving process of data included in the wireless signal. When no carrier is sensed, or the receiving process is finished, the wireless device transits the power saving mode. As seen from the above, the wireless device is adapted not to be always in an active state for carrier sensing, allowing power consumption to be reduced.

Note that the monitoring interval for the intermittent reception differs between the sensor node 1 and the relay node 3. In general, a data transmission frequency in a direction from a sensor node 1 to a relay node 3 (an upstream direction) is higher than a data transmission frequency in a direction from a relay node 3 to a sensor node 1 (a downstream direction). For that reason, the monitoring interval of the relay node 3 is shorter than the monitoring interval of the sensor node 1.

The sensor nodes 1 and the relay nodes 3 share a carrier. For that reason, a wireless signal transmitted from a certain sensor node 1 to a certain relay node 3 can be detected by the other sensor nodes 1 and the other relay nodes 3 as long as the radio wave of the wireless signal reaches well the other sensor nodes 1 and the other relay nodes 3. In addition, a wireless signal transmitted from a certain relay node 3 to a certain sensor node 1 is also detected by the other sensor nodes 1 and the other relay nodes 3 as long as the radio wave of the wireless signal reaches well the other sensor nodes 1 and the other relay nodes 3.

To distinguish between the sensor node 1 and the relay node 3, device type information (referred to as a device address (DEV_ADDR)) is set to the wireless device (RF LSI 20) included in each of the sensor node 1 and relay node 3, the device addresses differ between the sensor node 1 and relay node 3. In the example described in the embodiment, a device address "3" is set to each sensor node 1. In addition, a device address "2" is set to each relay node 3. The device addresses are common to the sensor nodes or the relay nodes, respectively. The device address is an example of "identification information corresponding to a device type (information that represents the device type)," and the device address "3" is an example of "identification information corresponding to a first device type", "information representing a first device type", and the device address "2" is an example of "identification information corresponding to a second device type", "information indicating a second device type". Note that the data center 2 may wirelessly communicate with the relay nodes 3. In addition, to the destination host in the data center 2, a device address equivalent to information representing a third device type may be assigned.

<Wireless Frame>

Figure 2:
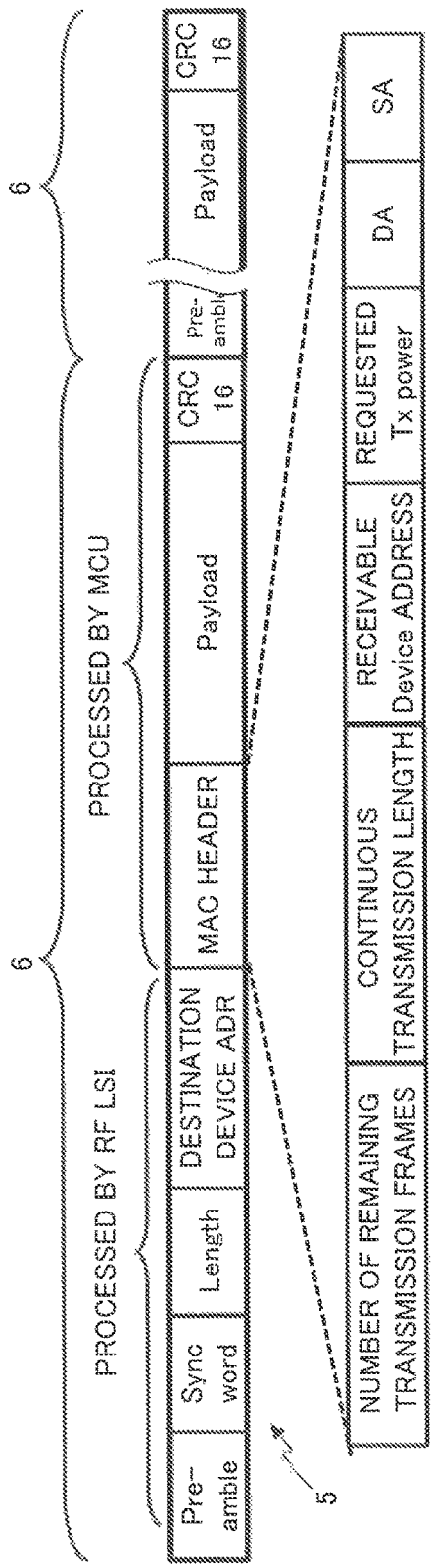
FIG. 2 is a diagram illustrating a format example of a wireless frame that is to be transmitted from each of wireless terminals (sensor nodes) and wireless relays (relay nodes)

FIG. 2 is a diagram illustrating a format example of a wireless frame (wireless signal) that is to be transmitted from each of the sensor nodes 1 and relay nodes 3. A wireless frame 5 illustrated in FIG. 2 has a format in which a subframe 6 with the same content is repeated during a predetermined time length (the transmission time period of a wireless frame 5). However, using the format with the repeated subframes 6 is not a requisite, and a single subframe 6 may be treated as the wireless frame 5.

The subframe 6 contains fields in which a preamble, a synchronization word (Sync Word: SW), a length (Length), a destination device address (DESTINATION DEVICE ADR) are disposed in this order, and a Media Access Control (MAC) frame that follows the destination device address. The MAC frame contains a MAC header, a payload (a data portion), and a Cyclic Redundancy Check (CRC) part. The MAC header and the payload are treated as the payload of the subframe 6.

The payload of the MAC frame contains data stored therein that is addressed to a destination. The CRC part is used for error check of the MAC frame. The MAC header contains fields that contain the number of remaining transmission frames, a continuous transmission length, a receivable device address, a requested transmission power (requested Tx Power), a destination MAC address, and a source MAC address, respectively.

In the field "length", information that represents the frame length (size: a byte count or a bit count) of the subframe 6 is stored. However, the frame length does not include the sizes of "length" and the CRC part. In the field "the number of remaining transmission frames", information representing the repetition number of subframes 6 that follow the subframes 6 having been received in the format in which the subframe 6 is repeated a predetermined number of times, is stored.

In the field "continuous transmission length", information representing the continuous transmission length of a wireless frame 5 (transmission time) is stored, the information being requested by a sensor node 1 or a relay node 3 to the source of the wireless frame 5 when the sensor node 1 or the relay node 3 receives the wireless frame 5. The continuous transmission length is specified in, for example, 100 msec units.

In the field "receivable device address", an identifier (device address) to identify a device type that is set to an RF chip (RF LSI) of a node being the source (a sensor node 1 or a relay node 3) is stored. The receivable device address is used as a declaration of a device type that is receivable for the source.

For example, when the relay node 3 receives a wireless frame from a sensor node 1 or the other relay node 3, "2" or "3" (the device address of the sensor node 1 or the relay node 3) is set as the receivable device address. In contrast, when the sensor node 1 receives a wireless frame from a relay node 3 but does not receive a wireless frame from the other sensor node 1, "2" (the device address of the relay node 3) is set as the receivable device address.

In the field "requested transmission power", information that representing a transmission power for the wireless frame that is requested from a node being the source of the wireless frame (the sensor node 1 or the relay node 3) is stored. Each of the sensor nodes 1 and the relay nodes 3 transmits a wireless frame that contains the above MAC header whenever performing wireless transmission. This enables a node to inform or notify the other nodes of a device type that is receivable at the node.

<Wireless Communication Apparatus>

FIG. 3 illustrates a configuration example of a wireless communication apparatus 10 that is operable as either a sensor node 1 or a relay node 3. The wireless communication apparatus 10 includes the RF LSI 20 that performs wireless processing (hereafter, denoted as an LSI 20) and an MCU 30 that performs operation control of the LSI 20 and processes received data. The LSI 20 and the MCU 30 both switches between power-saving mode (sleep mode) and active mode. Power consumption in the power saving mode is less than power consumption in the active mode.

The LSI 20 includes an RF processing unit 22 that is connected to an antenna 21, a reception detecting unit 23 that is connected to the RF processing unit 22, a synchronization word (SW) identification unit 24 that is connected to the reception detecting unit 23, and a reception notification unit 25 that is connected to the synchronization word identification unit 24. The LSI 20 further includes a reception unit 26 that is connected to the synchronization word identification unit 24, a buffer 26A that is connected to the reception unit 26, and a control unit 27 that is connected to the reception unit 26. The LSI 20 further includes a timer 28 that is connected to the control unit 27, and a transmission unit 29 that is connected to the control unit 27, the transmission unit 29 being connected to the RF processing unit 22.

The LSI 20 is an example of a "wireless device" or a "wireless processing unit." Note that a part or the whole of processing performed by at least the control unit 27 of the LSI 20 may be performed by a processor executing a program.

The MCU 30 is electrically connected to the LSI 20 and includes a Read Only Memory (ROM) 31 and a Random Access Memory (RAM) 32. The MCU 30 is an example of "a control device", "a processing device", "an upper processing unit", and "an upper processing device". The ROM 31 and the RAM 32 are an example of "a storage device", "a storage", "a memory", "non-transitory recoding medium", and "computer readable recording medium". The RAM 32 is an example of "a storage device".

The MCU 30 may include, in addition to the ROM 31 and the RAM 32, or in place of the ROM 31, the other computer readable storage medium. As the storage medium, for example, at least one of a hard disk drive (HDD), a Solid State Drive (SSD), a flash memory, and an Electrically Erasable Programmable Read-Only Memory (EEPROM) can be selected.

To the MCU 30, an external host 41 is connected. To the external host 41, a sensor 42 is connected. The sensor 42 detects predetermined physical properties or phenomena. The type of the sensor 42 and objects to be detected do not matter. However, the sensor 42 is a component when the wireless communication apparatus 10 is a sensor node 1, and the sensor 42 is omitted in the case where the wireless communication apparatus 10 is a relay node 3. Note that the wireless communication apparatus 10 used as the relay node 3e includes a line I/F (not illustrated) that receives data from the MCU 30 and sends out the data to the wired network 4. As the line I/F, for example, a LAN card or a network interface card (NIC) can be applied.

The external host 41 is, for example, a computer that includes a processor, such as a Central Processing Unit (CPU), and a memory. The external host 41 handles an upper layer that is higher than a layer handled by the MCU 30 (e.g., the application layer). On the processor included in the external host 41, an operating system (OS) and various application programs are executed. By the execution, the external host 41 performs various processes. For example, when the wireless communication apparatus 10 is a sensor node, the external host 41 generates data indicating phenomena or physical properties detected by the sensor 42 and transmits the data to the MCU 30. Alternatively, when the wireless communication apparatus 10 is a relay node 3, the external host 41 receives the data transmitted from the sensor node 1 from the MCU 30 and performs a predetermined process in the application layer, such as the compilation or processing of data.

The LSI 20 is an LSI chip that carries out a function of performing the transmission-reception process of a wireless frame 5. The above-mentioned device address is set (assigned) to the LSI 20. The LSI 20 may include a programmable logic device (PLD) such as a Field Programmable Gate Array (FPGA). Alternatively, the LSI 20 may include a processor, such as a Digital Signal Processor (DSP), a CPU, and an MCU, and a memory.

The RF processing unit 22 performs the receiving process of a wireless signal (a wireless frame 5) that is received from the antenna 21, and the transmission process of a wireless signal (a wireless frame 5) to be transmitted from the antenna 21.

The reception detecting unit 23 carries out carrier sense to detect a wireless frame 5 that is received by the RF processing unit 22. Specifically, the reception detecting unit 23 detects the reception when the reception strength (Received Signal Strength Indicator (RSSI)) of radio waves received by the antenna 21 exceeds a threshold value. The carrier sense is carried out at monitoring intervals set in advance.

The synchronization word identification unit 24 stands by for a synchronization word in the carrier when the reception detecting unit 23 senses the carrier. The synchronization word identification unit 24 has a standby (or waiting) timer for a synchronization word. If a synchronization word is received before the standby timer expires, the synchronization word identification unit 24 determines whether or not the synchronization word matches a synchronization word that is saved (or stored) in advance in the LSI 20. That is, the synchronization word identification unit 24 checks a synchronization word.

The reception notification unit 25 transmits a reception notification to the MCU 30 with an interrupt when the synchronization words match (the synchronization word check result is OK) in the synchronization word identification unit 24, and causes the MCU 30 to release the power saving mode (causes the MCU 30 to transit to the active mode).

The reception unit 26 receives a payload and stores the payload in the buffer 26A when the synchronization words match in the synchronization word identification unit 24. The buffer 26A has, for example, a queue (FIFO (First-In First-Out)) in which payloads are accumulated in order of arrival.

The control unit 27 controls the operation of the units of the LSI 20. For example, the control unit 27 performs the setting of the interval (a monitoring interval) for the carrier sense with the timer 28, the setting of a time to be counted by the standby timer for a synchronization word included in the synchronization word identification unit 24, and the assembly of a wireless frame 5. In addition, the control unit 27 performs, under instructions from the MCU 30, the setting of a continuous transmission length, the setting of a transmission power, and the like. The transmission unit 29 performs the transmission process of a wireless frame 5. The timer 28 is a timer that manages the monitoring interval.

The MCU 30 loads a program stored in the ROM 31 into the RAM 32 and executes the program to perform various processes. For example, the MCU 30 performs a process of setting an interval for intermittent reception to the LSI 20. In addition, the MCU 30 performs a process on data received by the LSI 20. The MCU 30 performs a process on the MAC layer to analyze a MAC header in the received MAC frame. In this manner, the MCU 30 instructs the LSI 20 to maintain and control the power saving mode of the LSI 20 based on the number of remaining transmission frames, set the continuous transmission length (the number of repetitions of subframe 6), and control the transmission power based on a requested transmission power.

<Processing Example in Wireless Communication Apparatus>
<<Processing Performed by MCU in Wireless Frame Reception>>

Figure 4:
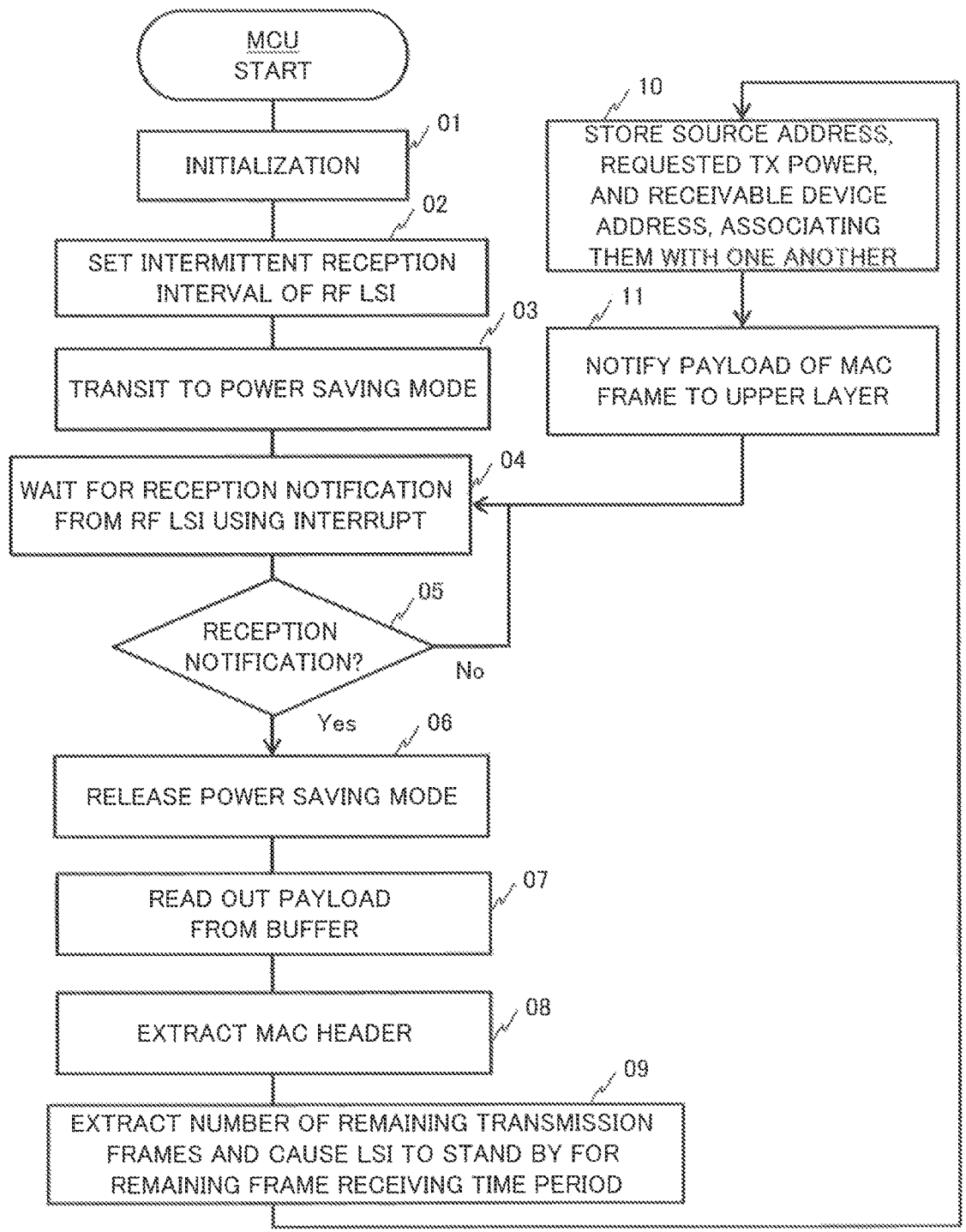
FIG. 4 is a flow chart illustrating a processing example performed by an MCU 30 in the reception of a wireless frame, in the wireless communication apparatus.
Figure 6:
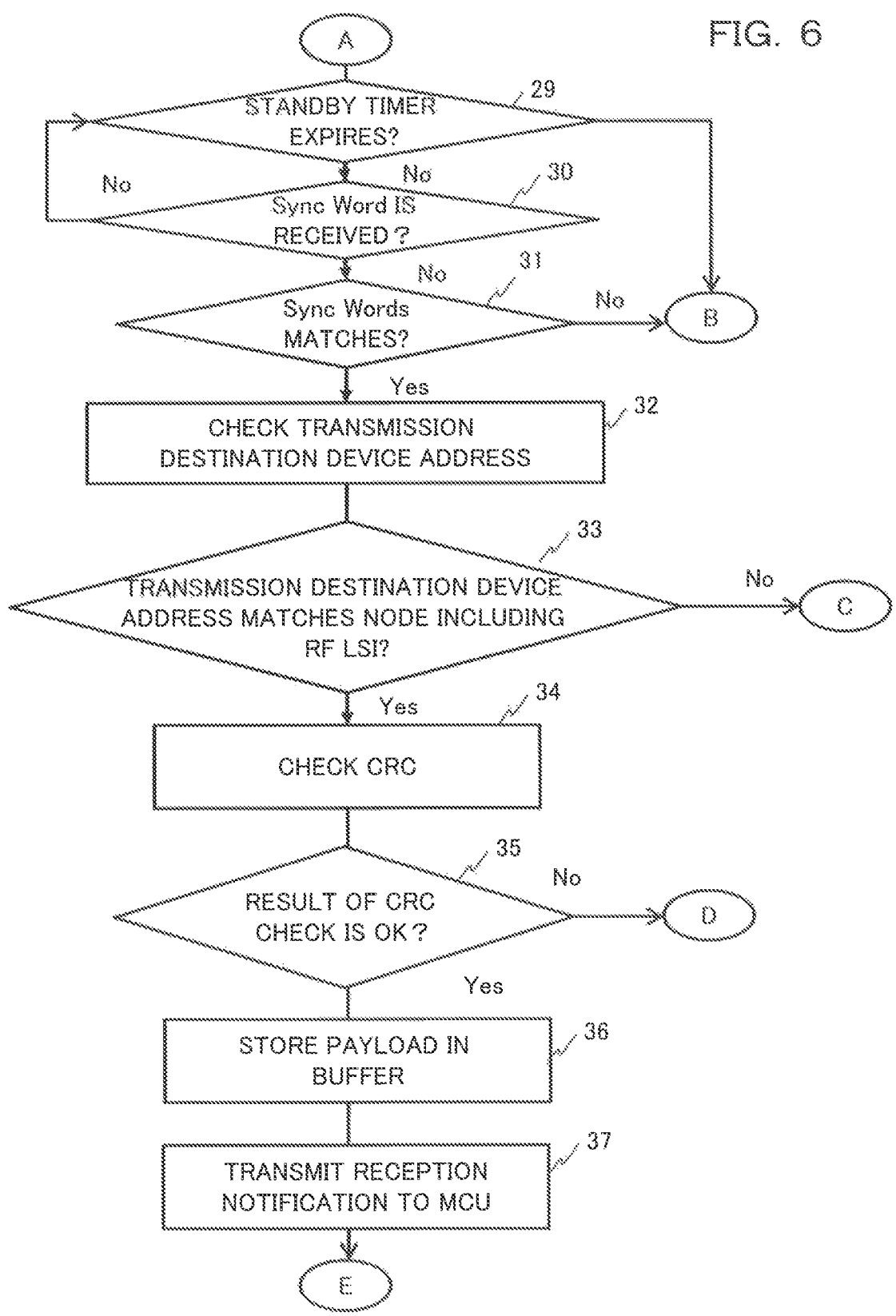
FIG. 6 is a flow chart illustrating the processing example performed by the RF LSI in the reception of the wireless frame.

FIG. 4 is a flow chart illustrating an example of processing performed by the MCU 30 in receiving a wireless frame 5 in the wireless communication apparatus 10. The processing illustrated in FIG. 6 is started by, for example, a predetermined trigger such as power-on of the MCU 30. In a process of 01, the MCU 30 performs an initialization process.

In a process of 02, the MCU 30 sets an interval (a monitoring interval) for the intermittent reception of the LSI 20. The MCU 30 transmits a setting instruction that contains the value of the interval, to the control unit 27 of the LSI 20. In the LSI 20, the control unit 27 sets the interval under the setting instruction. The interval can be determined in consideration of the continuous transmission length (the number of repetitions of subframe 6) that is notified from the source of the wireless frame 5.

In a process of 03, the MCU 30 transits to the power saving mode. That is, the MCU 30 is brought into a state of standing by for a reception notification with an interrupt from the LSI 20 (04 and 05). In the power saving mode, the MCU 30 is brought into a state (power-off) of stopping its operation and processing except for standing by for a reception notification.

When the reception notification is received in the process of 05 (Yes in 05), the MCU 30 releases the power saving mode to transit to the active mode (06). The MCU 30 reads out a payload (a MAC frame: a MAC header and its payload) from the buffer 26A (07). In a process of 08, the MCU 30 extracts the MAC header from the payload.

In a process of 09, the MCU 30 performs the following processes. That is, the MCU 30 extracts the number of remaining transmission frames from the MAC header. The MCU 30 calculates the end (the end time) of the wireless frame 5 using the number of remaining transmission frames. The calculation of the end time is performed, for example, as follows. The size (the bit count or the byte count) of the remaining wireless frames is calculated from the number of remaining transmission frames the frame length (the value of the length field) of the subframe 6. The MCU 30 converts the size the remaining wireless frame 5 (the total size the remaining subframes 6) into a time using a transmission speed (known to the LSI 20). Note that the value of the length field may be notified to the MCU, being contained in, for example, a reception notification from the reception notification unit 25, and may be stored in the buffer 26A and taken out to the MCU 30, together with the MAC frame.

The MCU 30 notifies the control unit 27 of the result of the calculation (the end time of the wireless frame 5). The control unit 27 sets the timer 28 such that the timer 28 expires, for example, with a CS timing that first comes after the end time of the wireless frame 5. In other words, the control unit 27 sets the timer 28 so as not to generate the timing of the carrier sense at least before the end of the wireless frame 5.

In a process of 10, the MCU 30 stores in the RAM 32 the source address (the source MAC address), the requested transmission power, and the receivable device address contained in the MAC header associating them with one another. At this point, the MCU 30 can store them further associating with the continuous transmission length contained in the MAC header.

In a process of 11, the MCU 30 notifies a superordinate of the payload of the MAC frame. That is, the payload of the MAC frame is transmitted to the external host 41. The external host 41 performs a process of the application layer using data in the payload. When the process of 11 is finished, the processing of the MCU 30 returns to the process of 04, and the MCU 30 transits to the power saving mode again.

<<Processing Performed by LSI in Wireless Frame Reception>>

Figure 5:
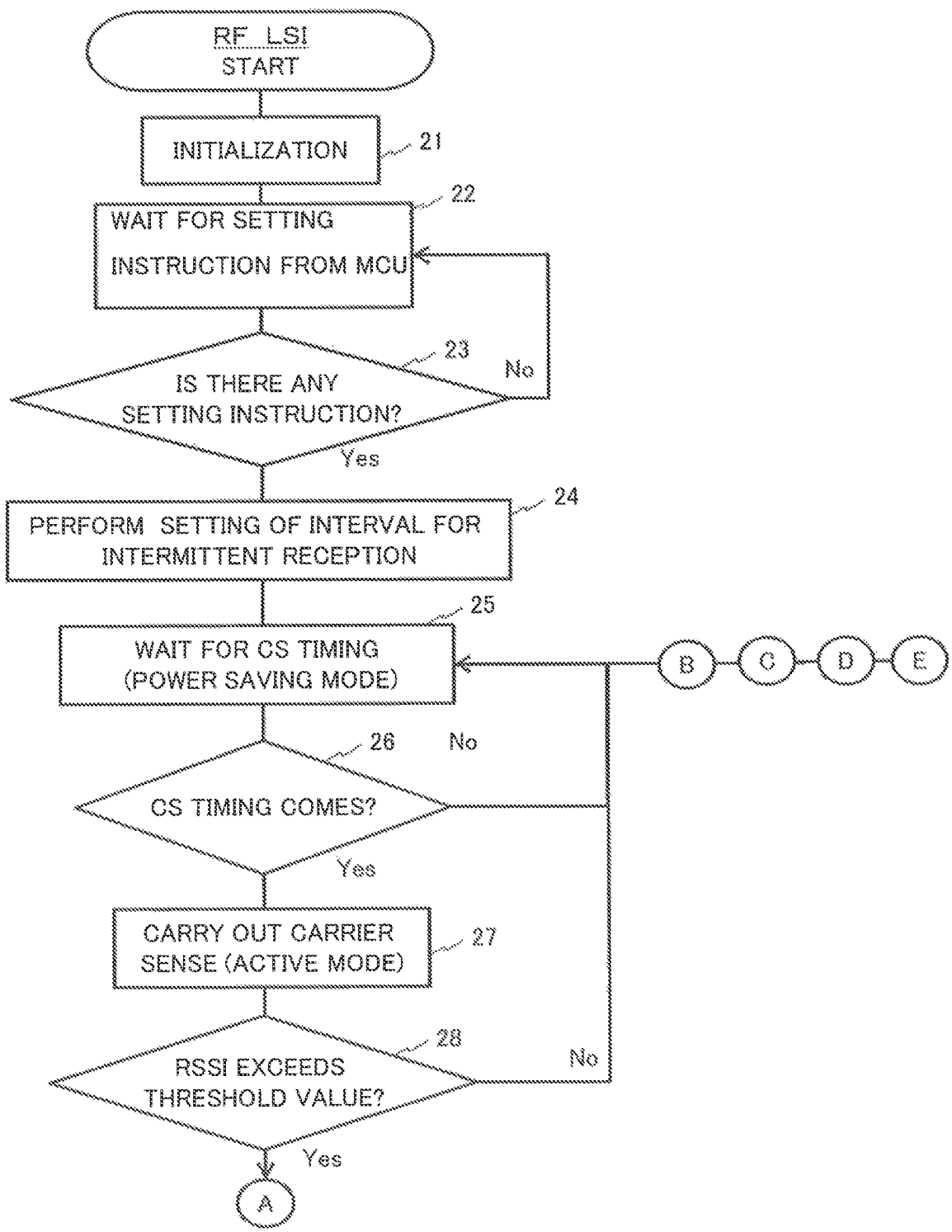
FIG. 5 is a flow chart illustrating a processing example performed by an RF LSI in the reception of a wireless frame.

FIG. 5 and FIG. 6 are a flow chart illustrating an example of processing performed by the LSI 20 in receiving a wireless frame 5. The processing illustrated in FIG. 5 is started by, for example, a predetermined trigger such as power-on of the LSI 20. In a process of 21, the LSI 20 performs an initialization process.

When finishing the initialization, the LSI 20 stands by for a setting instruction of the interval of the intermittent reception from the MCU 30 (21 and 22). When the setting instruction is input from the MCU 30, the LSI 20 performs interval setting on the intermittent reception (process of 24). That is, the control unit 27 receives the setting instruction from the MCU 30 and sets the interval specified with the setting instruction to the timer 28. This causes the carrier sense to be carried out by the reception detecting unit 23 whenever the timer 28 expires. The carrier sense is an example of sensing a wireless frame.

When the setting of the interval is finished, the LSI 20 transits to the power saving mode and comes into a state of standing by for a carrier sense (CS) timing (process of 25). That is, the LSI 20 waits for the expiration of the timer 28. In the power saving mode of the LSI 20, the LSI 20 comes into a state (power-off) of stopping its operation and processing except for the function in which that the control unit 27 stands by for the expiration of the timer 28.

When the expiration of the timer 28, namely, the CS timing comes (Yes in 26), the LSI 20 transits from the power saving mode to the active mode, and the reception detecting unit 23 carries out the carrier sense (process of 27). That is, the reception detecting unit 23 measures the Received Signal Strength Indicator (RSSI) of radio waves received by the antenna and determines whether or not the RSSI exceeds a predetermined threshold value (process of 28). When the RSSI do not exceed the threshold value (No in 28), it is considered that no carrier is sensed, the processing returns to the process of 25, where the LSI 20 transits to the power saving mode to stand by until the next CS timing.

On the other hand, when the RSSI exceeds the threshold value (Yes in 28), the processing proceeds to a process of 29. In the process of 29, the synchronization word identification unit 24 sets the standby timer for a synchronization word and stands by for the reception of a synchronization word (30). When a synchronization word is received before the expiration of the standby timer (Yes in 30), the processing proceeds to a process of 31. On the other hand, when the standby timer expires (Yes in 29), the LSI 20 transits to the power saving mode and waits for the next CS timing (25).

In the process of 31, the synchronization word identification unit 24 checks the synchronization word. That is, the synchronization word identification unit 24 compares the received synchronization word with a synchronization word that is saved in advance in the LSI 20 to determine whether or not the both of them match. At this point, when the synchronization words do not match (No in 31), the processing returns to the process of 25.

On the other hand, when the synchronization words match (Yes in 31), the reception unit 26 checks a transmission destination device address that is set in the MAC header in a payload (MAC frame) following the synchronization word (32). That is, the reception unit 26 determines whether or not the transmission destination device address matches the device address of the node including the LSI 20.

When the transmission destination device address does not match the device address of the node including the LSI 20 (No in 33), the MAC frame is not received, and the processing returns to the process of 25. On the other hand, when the transmission destination device address matches the device address of the node including the LSI 20 (Yes in 33), the processing proceeds to a process of 34.

In the process of 34, the reception unit 26 performs CRC check (34), and when a result of CRC check is OK (Yes in 35), the payload (MAC frame) is stored in the buffer 26A (36). On the other hand, when the CRC check result is NG (No in 35), the payload is not stored, and the LSI 20 comes in a state of standing by for the next CS timing (25).

When the payload is successfully stored in the buffer 26A, the reception notification unit 25 transmits a reception notification (indicating the completion of receiving the MAC frame) to the MCU 30 with an interrupt (37). In this manner, the MCU 30 performs processes subsequent to the process of 06 in FIG. 4. Afterward, the processing returns to the process of 25.

<<Processing Performed by MCU in Wireless Frame Transmission>>

Figure 7:
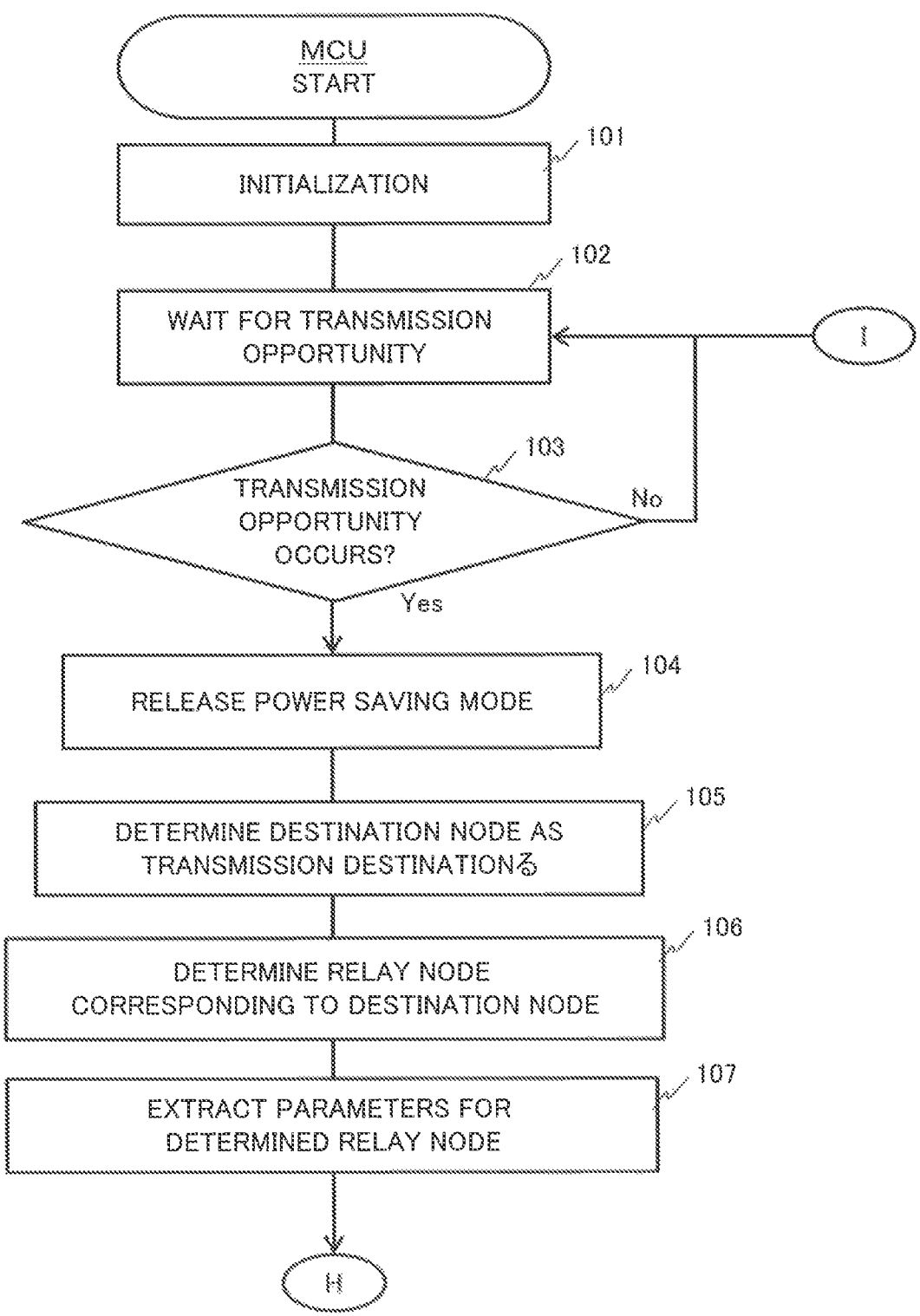
FIG. 7 is a flow chart illustrating the processing example performed by the MCU in the transmission of a wireless frame.
Figure 8:
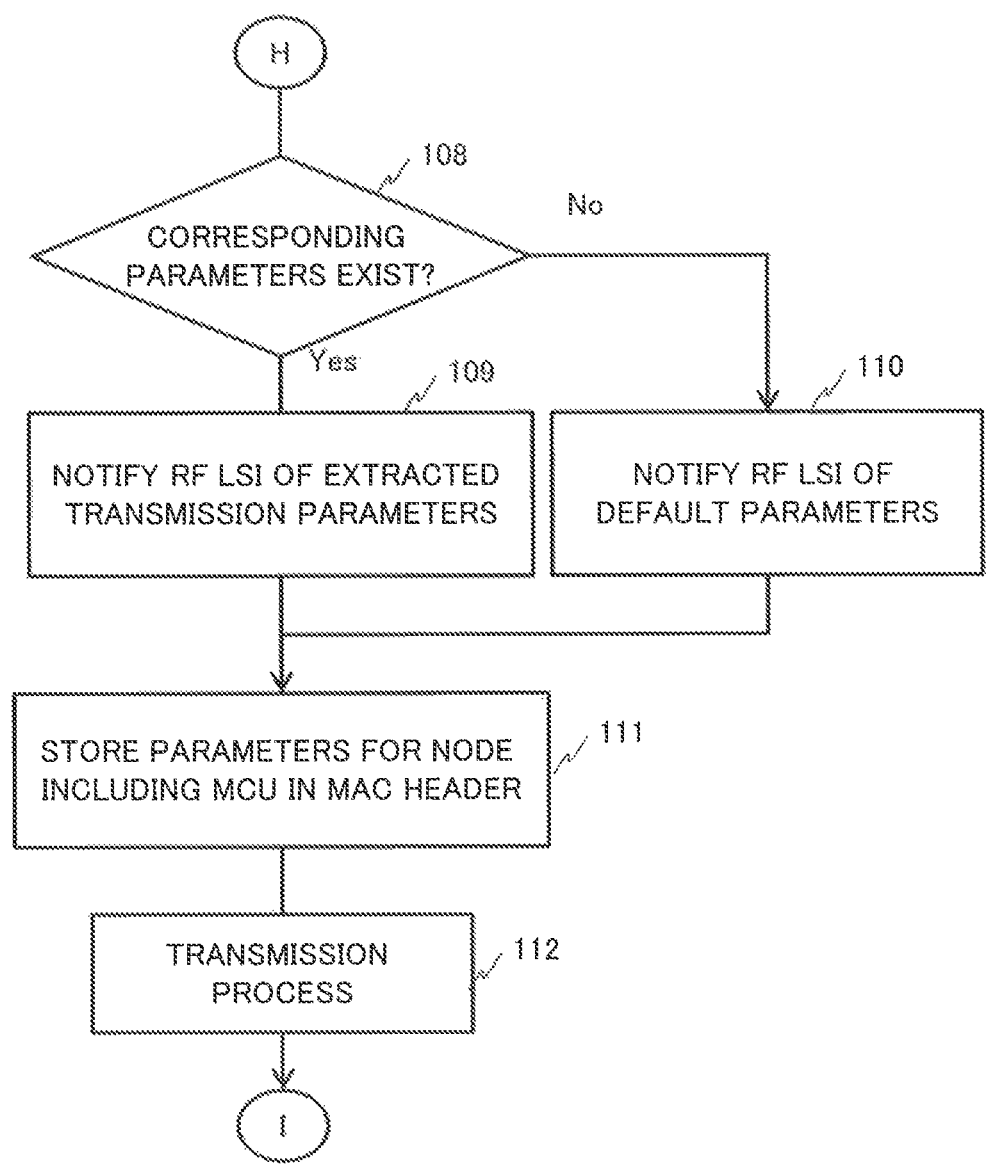
FIG. 8 is a flow chart illustrating the processing example performed by the MCU in the transmission of a wireless frame.

FIG. 7 and FIG. 8 are a flow chart illustrating an example of processing performed by the MCU 30 in the transmission of a wireless frame 5. In a process of 101, the MCU 30 performs an initialization process. When the initialization is finished, the MCU 30 waits for transmission opportunity (trigger) (102 and 103). The transmission opportunity can be determined as appropriate. For example, an interrupt notification from the upper layer (the external host 41) can be determined as the transmission opportunity. The interrupt notification may be provided regularly or irregularly. Alternatively, the transmission opportunity may be managed by a timer to occur whenever the timer expires.

When the transmission opportunity occurs (Yes in 103), the MCU 30 releases the power saving mode and transits to the active mode (104). Then, the MCU 30 starts editing the MAC frame.

The payload (data on the transmission target) of the MAC frame is provided, for example, from the upper layer (the external host 41). The MCU 30 determines a destination node (e.g., the destination host in the data center 2) as the transmission destination of the MAC frame (105). Next, the MCU 30 determines a relay node 3 corresponding to the destination node (106). The MCU 30 next extract transmission parameters for the relay node 3 from the RAM 32, the transmission parameters being received from the determined relay node 3 in advance, (107). The transmission parameters contain a requested transmission power from the transmission destination.

At this point, when the corresponding transmission parameter exists in RAM 32 (Yes in 108), the MCU 30 notifies the LSI 20 of the corresponding transmission parameters (the requested transmission power from the transmission destination) (109) and makes the processing proceed to a process of 111. On the other hand, when the corresponding transmission parameter does not exist in the RAM 32 (No in 108), the MCU 30 notifies the LSI 20 of transmission parameters for a default relay node 3 (e.g., stored in ROM 31 before shipping) (110) and makes the processing proceed to a process of 111.

In the process of 111, the MCU 30 stores parameters for the node including the MCU 30 in the MAC header. That is, the MCU 30 sets to the MAC header the number of remaining transmission frames, the continuous transmission length, the receivable device address, and the requested transmission power of the node including the MCU 30. In addition, the destination address and the source address are set to the MAC header. When a wireless frame is transmitted from a sensor node 1 to a relay node 3, the MAC address of the relay node 3 is set to the destination address, as the destination address, and the MAC address of the sensor node 1 is set to the source address, as the source address.

Note that, the parameters for the node including the MCU 30 may be stored in advance in the ROM 31. Alternatively, the parameters for the node including the MCU 30 that are received from an external device such as the external host 41 may be saved in the RAM 32.

Afterward, the MCU 30 performs the transmission process (112). That is, the MAC frame is sent out to the LSI 20. At this point, the MCU 30 sends out MAC frames the number of which corresponds to the continuous transmission length of the node including the MCU 30. To the number of remaining transmission frames of each MAC frame, a value decremented by one from a maximum value is set so as to have the maximum value in the first MAC frame and represent zero in the last MAC frame. Afterward, the processing returns to the process of 102, where the MCU 30 transits to the power saving mode and stands by for a transmission opportunity.

Figure 9:
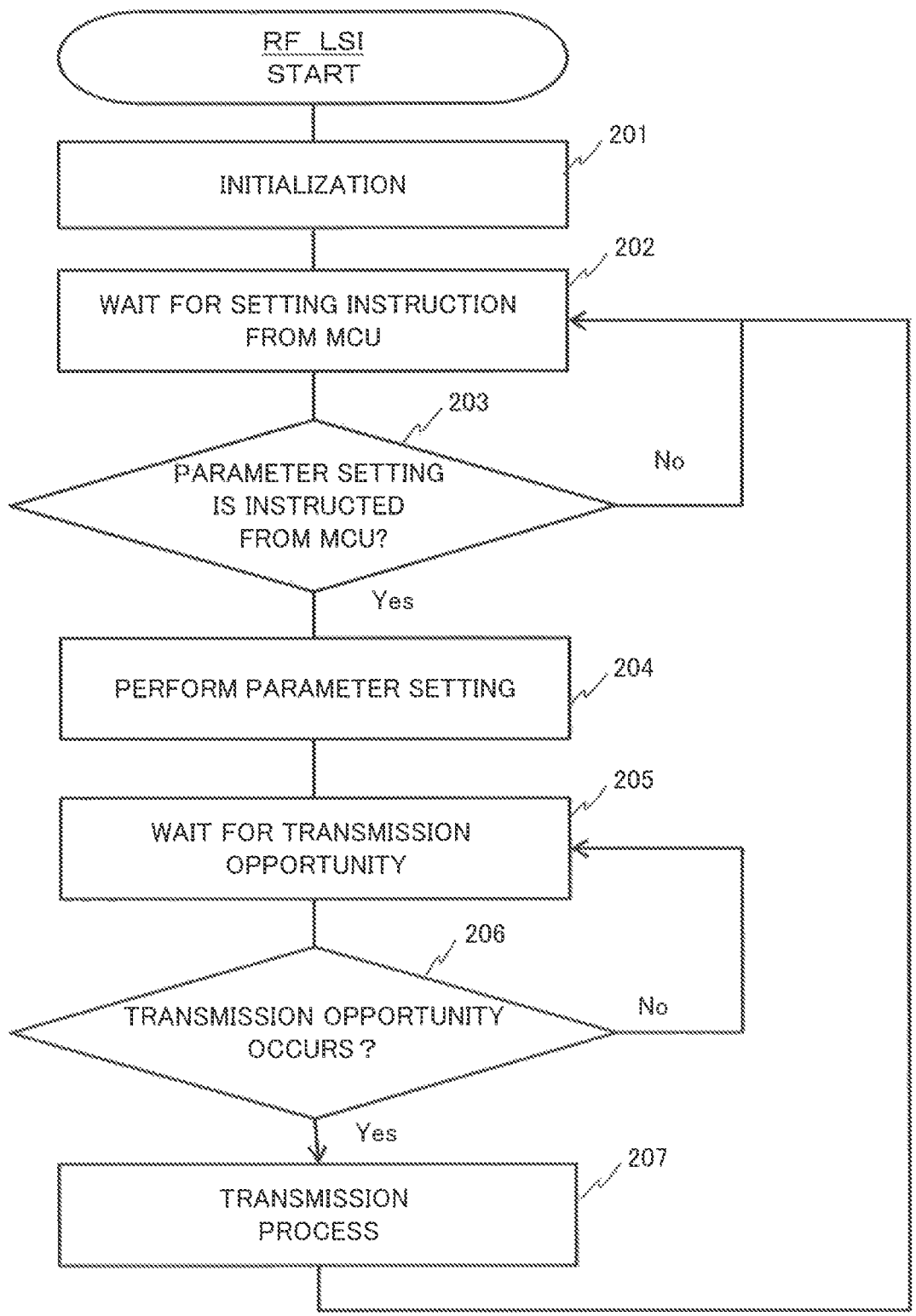
FIG. 9 is a flow chart illustrating the processing example performed by the RF LSI in the transmission of a wireless frame.

FIG. 9 is a flow chart illustrating an example of processing performed by the LSI 20 in transmitting a wireless frame 5. The processing illustrated in FIG. 9 is started, for example, simultaneously with the process of the process of 101 performed by the MCU 30. In a process of 201, the LSI 20 performs an initialization process. When the initialization is finished, the LSI 20 stands by for the notification of transmission parameters from the MCU 30 (202 and 203).

When the transmission parameters are notified, the LSI 20 performs a setting, using the transmission parameters, for the transmission of the wireless frame 5 toward the relay node 3 (204). At this point, the setting of a transmission power for the wireless frame 5 is performed. When the transmission parameters notified from the MCU 30 contain a requested transmission power from the relay node 3, the transmission power is set at the value of the requested transmission power. Afterward, the LSI 20 waits for a transmission opportunity (205 and 206). That is, the LSI 20 waits for the arrival of a MAC frame from the MCU 30.

When the MAC frame arrives, the LSI 20 determines that a transmission opportunity occurs (Yes in 206), and performs a transmission process (207). That is, in the LSI 20, for example, the transmission unit 29 performs a process of giving a preamble, a synchronization word, a length, a transmission destination device address, and a CRC part to each MAC frame that arrives from the MCU 30 to assemble each subframe 6. At this point, the LSI 20 sets the device address of the reception destination of the wireless frame 5 as the transmission destination device address.

The transmission unit 29 joins the subframes 6 to form them into the format of a wireless frame 5 and transmits the wireless frame 5 to the RF processing unit 22. The RF processing unit 22 covers the wireless frame 5 into a wireless signal and emits the wireless signal through the antenna 21. At this point, the wireless signal is transmitted at the transmission power that is set in the process of the process of 204. When the process of 207 is finished, the processing returns to the process of 202.

<Effects of Embodiment>

With the above-described embodiment, the following operation (s) occur and effects are obtained by the operation (s). When each sensor node 1 transmits a wireless frame 5 to a relay node 3 at a default transmission power, a radio wave coverage A may be a coverage that is illustrated by a circle of a dash-dot line in FIG. 1. In this case, a radio wave from the sensor node 1 reaches the relay node 3*a*, which is an original transmission destination, as well as the relay node 3*b* and the relay node 3*d* that are located around the periphery of the relay node 3*a*. For that reason, the LSIs 20 and the MCUs 30 of the relay node 3*b* and the relay node 3*d* may release the power saving mode, and may receive a MAC frame in the wireless frame 5 and process the MAC frame. However, these processes are needless processes, which consume the power of the relay node 3*b* and the relay node 3*d* uselessly.

In contrast to this, in the embodiment, each relay node 3, for example, the relay node 3*a* may provide a notification of a requested transmission power through the transmission of a wireless frame 5 to each subordinate sensor node 1 (each sensor node 1 wirelessly connected to the relay node 3). As the requested transmission power, such a transmission power is requested at which an RSSI having a threshold value or more may be obtained at the relay node 3*a* whereas no radio wave reaches the relay node 3*b* and the relay node 3*d*, or the RSSI of a radio wave falls below the threshold value.

Each sensor node 1 subordinate to the relay node 3*a* reduces a transmission power for a wireless frame 5 in accordance with the requested transmission power. This causes the radio wave coverage to be narrowed to a coverage B illustrated in FIG. 1. Therefore, a radio wave from each sensor node 1 is unable to be detected by the relay node 3*b* and the relay node 3*d*. For that reason, needless processes in the relay node 3*b* and the relay node 3*d* are avoided. That is, it is possible to reduce the power consumption of the relay node 3*b* and the relay node 3*d*.

In addition, in the embodiment, a transmission destination device address is set to each subframe 6 of a wireless frame 5 (207). When a wireless frame 5 addressed to a relay node 3 is to be transmitted, each sensor node 1 sets the device address "2" representing the relay node 3 to the transmission destination device address. When a wireless frame 5 addressed to a sensor node 1 is to be transmitted, each relay node 3 sets the device address "3" representing the sensor node 1 to the transmission destination device address.

Through the processes of 32 and 33 illustrated in FIG. 6, the LSI 20 receiving a wireless frame 5 checks a transmission destination device address, and when the transmission destination device address does not match the device address of the node including the LSI 20, stops the reception of the wireless frame 5. It is thereby possible to avoid transmitting a reception notification to the MCU 30 in the reception of a needless wireless frame 5 and causing the MCU 30 to transit to the active mode. Therefore, the power consumption of the MCU 30 can be reduced.

With the above, even when a wireless frame 5 transmitted by a certain sensor node 1 toward the relay node 3*a* is detected by the other sensor node 1, the MCU 30 of the other sensor node 1 does not transit to the active mode in response to a reception notification, and it is thus possible to avoid increasing the power consumption of the other sensor node 1. In addition, even when a wireless frame 5 addressed to a sensor node 1 transmitted by a certain relay node 3 is detected by the other relay node 3, the MCU 30 of the other relay node 3 does not transit to the active mode in response to a reception notification, and it is thus possible to avoid increasing the power consumption of the other relay node 3. In addition, even when a wireless frame 5 transmitted by a certain relay node 3, the wireless frame 5 being addressed to the other relay node 3, is detected by a sensor node 1, the MCU 30 of the sensor node 1 does not transit to the active mode in response to a reception notification, and it is thus possible to avoid increasing the power consumption of the sensor node 1.

Figure 10:
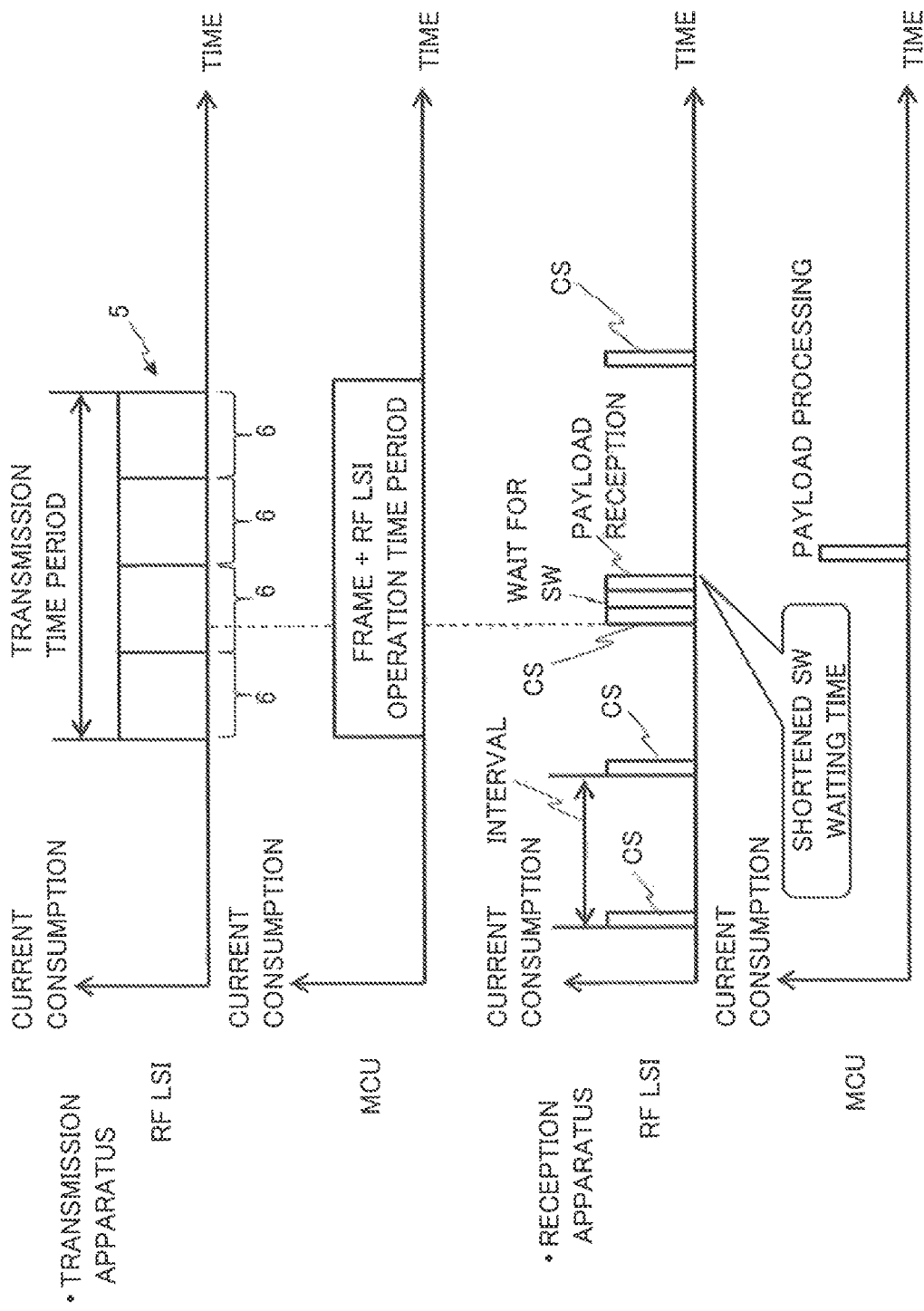
FIG. 10 is an explanatory diagram of operational advantage according to the embodiment.

In addition, in the embodiment, a wireless frame 5 has a format in which a subframe 6 is repeated during a transmission time. In the example described in the embodiment, a subframe 6 is consecutively repeated in a wireless frame 5. FIG. 10 is a diagram illustrating an advantage of the format. As illustrated in FIG. 10, the LSI 20 of a node on a reception side with respect to a wireless frame 5 (a sensor node 1 or a relay node 3) senses by carrier sense (CS) some subframe 6 in a wireless frame 5. At this point, the LSI 20 receives a payload (a MAC frame) if a check on a synchronization word turns out OK.

Now, it is assumed that one synchronization word and one MAC frame that have the same sizes as the respective synchronization word and MAC frame of a subframe 6 are transmitted during the transmission time of a wireless frame 5. In this case, the synchronization word and the MAC frame are located at the end of the transmission time, and a long preamble is located at the front of the synchronization word and the MAC frame. This takes a long time from the sensing of the preamble to the reception of the synchronization word, increasing a time period during which the LSI 20 consumes power in the active mode.

In the embodiment, a subframe 6 that contains the same synchronization word and the same MAC frame (differing merely in the number of remaining transmission frames) is repeated, and it is thus possible to shorten a time period from sensing a preamble by the LSI 20 until receiving a synchronization word and obtaining a check result. It is thereby possible to reduce a time period during which the LSI 20 is in the active state, reducing the power consumption.

FIG. 11 is an explanatory diagram of an advantage of the process of 09 in FIG. 4. As illustrated in FIG. 11, it is assumed that a node (a sensor node 1 or a relay node 3) on the reception side senses some subframe 6 in a wireless frame 5, the receiving process is performed on a MAC frame in the subframe 6. In the example illustrated in FIG. 11, when the MAC frame is received, the subframe 6 has been repeated ten times. Afterward, the node on the reception side senses the remaining subframes 6 to receive a MAC frame, but the payload of the MAC frame to be obtained is already received. For that reason, there is no need to perform the receiving process again on the MAC frame from the same wireless frame 5.

In view of the above, in the process of 09 in FIG. 4, the end time of a wireless frame 5 is calculated using the number of remaining repetitions of a subframe 6, and the timer 28 is set such that the LSI 20 does not release the power saving mode until the end time even when timing for the carrier sense comes. This allows the power saving mode of the LSI 20 to be maintained and another sensing of a wireless frame 5 to be avoided. In such a manner, it is possible to achieve the power consumption reduction of the LSI 20 and the MCU 30 of a node on the reception side.

In addition, in the embodiment, it is possible for a node on the reception side with respect to a wireless frame to adjust a monitoring interval based on a continuous transmission length that is notified from a node on the transmission side with respect to a wireless frame 5. It is thereby possible to accommodate the difference between the monitoring interval of a sensor node 1 and a monitoring interval of a relay node 3.

Note that, the embodiment describes a wireless terminal (sensor node) 1 that transmits data based on phenomena or physical properties detected by the sensor 42, toward the data center 2. However, the inclusion of the sensor in the wireless terminal 1 and the transmission data based on a detection result from the sensor are not requisites. That is, the wireless terminal 1 may be a communication system that transmits data addressed to the data center 2 (a destination node).

As the embodiment, it is possible to achieve power consumption reduction by avoiding a needless receiving process. The configurations of the embodiment described above can be combined as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system, comprising:
   a plurality of sensors each of which belongs to a first device type;
   a relay apparatus belonging to a second device type, the relay apparatus being capable of wireless communication with the plurality of sensors; and
   a communication apparatus belonging to a third device type, the communication apparatus performing wireless communication with the relay apparatus,
   each of the plurality of sensors comprising a first integrated circuit configured to perform:
   generating and transmitting a wireless signal containing data to which identification information corresponding to a device type of a device being a destination is added;
   transferring from a power saving mode to a non-power saving mode and detecting a wireless signal that reaches the first integrated circuit during the non-power saving mode;
   performing wireless processing of the detected wireless signal;
   passing data obtained by the wireless processing to a first processor when the detected wireless signal includes data to which identification information corresponding to the first device type is added; and
   stopping processing to obtain data from the detected wireless signal and returning to the power saving mode when the detected wireless signal includes data to which information corresponding to the second or third device type is added, and
   the relay apparatus comprising a second integrated circuit configured to provide data contained in a wireless signal received by the second integrated circuit to a second processor when the received wireless signal contains data to which identification information corresponding to the second device type is added,
   wherein the first integrated circuit is configured to:
   obtain identification information indicating the second device type used by the relay apparatus capable of receiving a wireless signal transmitted from the plurality of sensors; and
   transmit a wireless signal including data addressed to the relay apparatus and the identification information indicating the second device type, and wherein the second integrated circuit is configured to:
obtain identification information indicating the first device type used by the plurality of sensors capable of receiving a wireless signal transmitted from the relay apparatus; and
transmit a wireless signal including data addressed to any one of the plurality of sensors and the identification information indicating the first device type.

2. The wireless communication system according to claim 1, wherein:
when a specific sensor among the plurality of sensors performs wireless transmission to the relay apparatus, the specific sensor transmits a wireless signal including an address of the relay apparatus as a destination address of the wireless signal, an address of the specific sensor as a source address of the wireless signal, data containing identification information corresponding to a device type of the plurality of sensors, and identification information corresponding to a device type of the relay apparatus and added to the data, and
wherein the second wireless processing unit of the relay apparatus is configured to:
pass the data contained in the received wireless signal to the second upper processing unit when detecting the identification information corresponding to the device type of the relay apparatus; and
add the identification information corresponding to the device type of the plurality of sensors to data addressed to the specific sensor and provided from the second upper processing unit; and
transmit a wireless signal including the provided data and the added identification information.

3. The wireless communication system according to claim 2, wherein the destination address, the source address, the identification information corresponding to the device type of the plurality of sensors, and the information corresponding to the device type of the relay apparatus are transmitted for every transmission of a wireless signal.

4. A wireless communication system, comprising:
a plurality of wireless terminals each of which has a first device type, the plurality of wireless terminals each transmitting data to a destination; and
a plurality of wireless relay apparatuses each of which has a second device type different from the first device type, the plurality of wireless relay apparatuses each relaying the data that is received in wireless communication with the plurality of wireless terminals,
wherein each of the plurality of wireless terminals comprises:
an integrated circuit configured to transfer from a power saving mode to a non-power saving mode and to detect a wireless frame during the non-power saving mode; and
a processor configured to process data contained in the detected wireless frame and received by the integrated circuit,
wherein the integrated circuit of each of the plurality of wireless terminals configured to:
receive data contained in the detected wireless frame when a device type identifier included in the detected wireless frame represents a first device type used by the plurality of wireless terminals capable of receiving data contained in a wireless frame transmitted from the plurality of wireless relay apparatuses;
provide the received data to the processor;
stop reception of data contained in the detected wireless frame and return to the power saving mode when the device type identifier included in the detected wireless frame represents a device type other than the first device type;
obtain a device type identifier indicating a second device type used by the plurality of wireless relay apparatuses capable of receiving a wireless frame transmitted from the plurality of wireless terminals; and
transmit a wireless frame including data addressed to any one of the plurality of wireless relay apparatuses and the device type identifier indicating the second device type.

5. A wireless communication system, comprising:
a plurality of wireless terminals each of which has a first device type, the plurality of wireless terminals each transmitting data to a destination; and
a plurality of wireless relay apparatuses each of which has a second device type different from the first device type, the plurality of wireless relay apparatuses each relaying the data that is received from the plurality of wireless terminals, to the destination,
wherein each of the plurality of wireless relay apparatuses comprises:
an integrated circuit configured to transfer from a power saving mode to a non-power saving mode and to detect a wireless frame during the non-power saving mode; and
a processor configured to process data contained in the detected wireless frame and received by the wireless device,
wherein the integrated circuit of each of the plurality of wireless relay apparatuses configured to:
receive data contained in the detected wireless frame when a device type identifier included in the detected wireless frame represents a second device type used by the plurality of wireless relay apparatuses capable of receiving data contained in a wireless frame transmitted from the plurality of wireless terminals;
provide the received data to the processor;
stop reception of data contained in the detected wireless frame and return to the power saving mode when the device type identifier included in the detected wireless frame represents a device type other than the second device type;
obtain a device type identifier indicating a first device type used by the plurality of wireless terminals capable of receiving a wireless frame transmitted from the plurality of wireless relay apparatuses; and
transmit a wireless frame including data addressed to any one of the plurality of wireless terminals and the device type identifier indicating the first device type.

6. A wireless terminal communicating with a wireless relay apparatus, the wireless terminal comprising:
an integrated circuit configured to transfer from a power saving mode to a non-power saving mode and to detect a wireless frame during the non-power saving mode; and
a processor configured to process data contained in the detected wireless frame and received by the integrated circuit,
wherein the integrated circuit is configured to:
receive data contained in the detected wireless frame and provide the received data to the processor when a device type identifier included in the detected wireless frame represents a first device type used by the wireless terminal capable of receiving data contained in a wireless frame transmitted from the wireless relay apparatus;

stop reception of data contained in the detected wireless frame and return to the power saving mode when the device type identifier included in the detected wireless frame represents a device type other than the first device type;

obtain a device type identifier indicating a second device type used by the wireless relay apparatus capable of receiving a wireless frame transmitted from the wireless terminal; and transmit a wireless frame including data addressed to the wireless relay apparatus and the device type identifier indicating the second device type.

7. A wireless relay apparatus communicating with a wireless terminal, the wireless relay apparatus comprising:

an integrated circuit configured to transfer from a power saving mode to a non-power saving mode and to detect a wireless frame during the non-power saving mode; and a processor configured to process data contained in the detected wireless frame and received by the integrated circuit, wherein the integrated circuit is configured to:

receive data contained in the detected wireless frame and provide the received data to the processor when a device type identifier included in the detected wireless frame represents a second device type used by the wireless relay apparatus capable of receiving data contained in a wireless frame transmitted from the wireless terminal;

stop reception of data contained in the detected wireless frame and return to the power saving mode when the device type identifier included in the detected wireless frame represents a device type other than the second device type;

obtain a device type identifier indicating a first device type used by the wireless terminal capable of receiving a wireless frame transmitted from the wireless relay apparatus; and transmit a wireless frame including data addressed to the wireless terminal and the device type identifier indicating the first device type.

8. A data receiving method for a wireless terminal communicating with a wireless relay apparatus, the data receiving method comprising:

transferring, using a circuit, from a power saving mode to a non-power saving mode;

detecting, using the circuit, a wireless frame during the non-power saving mode;

receiving, using the circuit, data contained in the detected wireless frame when a device type identifier included in the detected wireless frame represents a first device type used by the wireless terminal capable of receiving data contained in a wireless frame transmitted from the wireless relay apparatus;

stopping, using the circuit, reception of data contained in the detected wireless frame and returning to the power saving mode when the device type identifier included in the detected wireless frame represents a device type other than the first device type;

obtaining, using the circuit, a device type identifier indicating a second device type used by the wireless relay apparatus capable of receiving data included in a wireless frame transmitted from the wireless terminal; and transmitting, using the circuit, a wireless frame including data addressed to the relay apparatus and the device type identifier indicating the second device type.

9. A data receiving method for a wireless relay apparatus communicating with a wireless terminal, the data receiving method comprising:

transferring, using a circuit, from a power saving mode to a non-power saving mode;

detecting, using the circuit, a wireless frame during the non-power saving mode;

receiving, using the circuit, data contained in the detected wireless frame when a device type identifier included in the detected wireless frame represents a second device type used by the wireless relay apparatus capable of receiving data contained in a wireless frame transmitted from the wireless terminal;

stopping, using the circuit, reception of data contained in the detected wireless frame and returning to the power saving mode when the device type identifier included in the detected wireless frame represents a device type other than the second device type;

obtaining, using the circuit, a device type identifier indicating a first device type used by the wireless terminal capable of receiving a wireless frame transmitted from the wireless relay apparatus; and transmitting, using the circuit, a wireless frame including data addressed to the wireless terminal and the device type identifier indicating the first device type.

10. A non-transitory computer-readable recording medium having stored therein a program for causing a computer included in a wireless terminal communicating with a wireless relay apparatus, the program for causing the computer to execute a process comprising:

transferring from a power saving mode to a non-power saving mode;

detecting a wireless frame transmitted from the wireless relay apparatus during the non-power saving mode;

receiving data contained in the detected wireless frame when the detected wireless frame contains information that represents a first device type being a device type used by the wireless terminal capable of receiving data contained in a wireless frame transmitted from the wireless relay apparatus; and stopping reception of the data contained in the detected wireless frame and returning to the power saving mode when the detected wireless frame contains information that represents a device type other than the first device type;

obtaining a device type identifier indicating a second device type used by the wireless relay apparatus capable of receiving a wireless frame transmitted from the wireless terminal; and transmitting a wireless frame including data addressed to the wireless relay apparatus and the device type identifier indicating the second device type.

11. A non-transitory computer-readable recording medium having stored therein a program for causing a computer included in a wireless relay apparatus communicating with a wireless terminal, the program for causing the computer to execute a process comprising:

transferring from a power saving mode to a non-power saving mode;

detecting a wireless frame transmitted from the wireless terminal during the non-power saving mode;

receiving data contained in the detected wireless frame when a device type identifier included in the detected wireless frame represents a second device type used by the wireless relay apparatus capable of receiving data contained in a wireless frame transmitted from the wireless terminal;

stopping reception of the data contained in the detected wireless frame and returning to the power saving mode when the device type identifier included in the detected wireless frame represents a device type other than the second device type;

obtaining a device type identifier indicating a first device type used by the wireless terminal capable of receiving a wireless frame transmitted from the wireless relay apparatus; and transmitting a wireless frame including data addressed to the wireless terminal and the device type identifier indicating the first device type.

12. A communication apparatus, comprising:

a circuit configured to:

obtain a device type identifier indicating a device type used by an apparatus capable of receiving data included in a wireless frame transmitted from the communication apparatus;

transmit a wireless frame including data addressed to the apparatus and the device type identifier;

transfer from a power saving mode to a non-power saving mode;

detect a wireless frame during the non-power saving mode;

receive data contained in the detected wireless frame and provide the received data to a processor, which performs processing of the received data, when a device type identifier included in the detected wireless frame corresponds to the communication apparatus; and stop reception of data contained in the detected wireless frame and return to the power saving mode when the device type identifier included in the detected wireless frame does not correspond to the communication apparatus.

13. A method of transmitting a wireless frame, comprising:

obtaining, using a circuit included in a communication apparatus, a device type identifier indicating a device type used by an apparatus capable of receiving data included in a wireless frame transmitted from the communication apparatus; and transmitting, using the circuit, a wireless frame including data addressed to the apparatus and the device type identifier;

transferring from a power saving mode to a non-power saving mode;

detecting a wireless frame during the non-power saving mode;

receiving data contained in the detected wireless frame and provide the received data to a processor, which performs processing of the received data, when a device type identifier included in the detected wireless frame corresponds to the communication apparatus; and stopping reception of data contained in the detected wireless frame and return to the power saving mode when the device type identifier included in the detected wireless frame does not correspond to the communication apparatus.

* * * * *